US009210722B2

(12) United States Patent
Batsuuri et al.

(10) Patent No.: US 9,210,722 B2
(45) Date of Patent: Dec. 8, 2015

(54) ESTABLISHING FAIRNESS AND REDUCING DELAY IN BROADCAST BASED VEHICLE TO VEHICLE COMMUNICATION USING APPLICATION-LEVEL PHASE ADJUSTMENTS

(71) Applicant: NX B.V., Eindhoven (NL)

(72) Inventors: Tseesuren Batsuuri, Ulaanbaatar (MN); Johannes Jan Lukkien, Best (NL); Reinder Jaap Bril, Waalre (NL)

(73) Assignee: NXP, B.V., Eindhoven (NL)

( * ) Notice: Subject to any disclaimer, the term of this patent is extended or adjusted under 35 U.S.C. 154(b) by 114 days.

(21) Appl. No.: 13/645,537

(22) Filed: Oct. 5, 2012

(65) Prior Publication Data
US 2013/0094493 A1 Apr. 18, 2013

(30) Foreign Application Priority Data

Oct. 12, 2011 (EP) ...................................... 11184905
Apr. 5, 2012 (EP) ...................................... 12163303

(51) Int. Cl.
*H04B 7/212* (2006.01)
*H04W 74/08* (2009.01)
*H04B 7/204* (2006.01)

(52) U.S. Cl.
CPC ........... *H04W 74/0816* (2013.01); *H04B 7/204* (2013.01); *H04B 7/212* (2013.01)

(58) Field of Classification Search
CPC ............................... H04B 7/204; H04B 7/212
USPC ......................................................... 370/347
See application file for complete search history.

(56) References Cited

U.S. PATENT DOCUMENTS

| 2004/0116126 A1* | 6/2004 | Cave et al. ..................... 455/450 |
| 2004/0128387 A1* | 7/2004 | Chin et al. ..................... 709/227 |
| 2005/0122231 A1* | 6/2005 | Varaiya et al. ........... 340/870.01 |
| 2006/0176896 A1* | 8/2006 | Callaway et al. ............. 370/437 |
| 2007/0115897 A1* | 5/2007 | Chen et al. ..................... 370/338 |
| 2007/0268868 A1* | 11/2007 | Singh et al. ..................... 370/331 |
| 2009/0240831 A1* | 9/2009 | Liu et al. ........................ 709/233 |
| 2010/0034177 A1* | 2/2010 | Santhanam ................... 370/338 |
| 2011/0122933 A1* | 5/2011 | Adam et al. ................... 375/219 |
| 2011/0237265 A1* | 9/2011 | Sugawara et al. ............. 455/450 |
| 2012/0120883 A1* | 5/2012 | Chen et al. ..................... 370/329 |
| 2014/0321305 A1* | 10/2014 | Lee et al. ....................... 370/252 |

FOREIGN PATENT DOCUMENTS

CN 101119151 A 2/2008

OTHER PUBLICATIONS

Yin, J., et al; "Performance Evaluation of Safety Applications Over DSRC Vehicular Ad Hoc Networks"; Proc. of the 1st ACM Int'l. Workshop on Vehicular Ad Hoc Networks, 9 pgs. (2004).

(Continued)

*Primary Examiner* — Farah Faroul

(57) ABSTRACT

A method for a station to periodically broadcast messages over a wireless channel to communicate to multiple other stations who transmit on the same channel, the station becomes ready to broadcast at successive message activation times, at a message activation time the station performing a Multiple Access mechanism (930) to resolve channel access competition and the station subsequently starting transmission of a message, wherein at least two successive message activation times differ a random time interval.

20 Claims, 9 Drawing Sheets

(56) References Cited

OTHER PUBLICATIONS

Nhtsa, "Vehicle Safety Communications Project Task 3 Final Report; Identify Intelligent Vehicle Safety Applications Enabled by DSRC," Techn. Rep. DOT HS 809 859 (Mar. 2005).

Choffnes, D., et al. "An Integrated Mobility and Traffic Model for Vehicular Wireless Networks," Proc. of the $2^{nd}$ ACM Int'l. Workshop on Vehicular Ad Hoc Networks, 9 pgs. (2005).

Bai, F., et al. "Reliability Analysis of DSRC Wireless Communication for Vehicle Safety Applications," 2006 IEEE Intelligent Transportation Systems Conf., pp. 355-362 (2006).

"IEEE Trial-Use Standard for Wireless Access in Vehicular Environments (WAVE)—Resource Manager," IEEE Std 1609.1, 73 pgs. (2006).

"IEEE Trial-Use Standard for Wireless Access in Vehicular Environments—Security Services for Applications and Management Messages,", Chapter 5—Secured Messages, IEEE Std 1609.2, cover-pg. x, pp. 17-34 (2006).

"IEEE Trial-Use Standard for Wireless Access in Vehicular Environments (WAVE)—Multi-Channel Operation", IEEE Std 1609.4, 84 pgs. (2006).

Baumann, R., et al. "Towards Realistic Mobility Models for Vehicular Ad-Hoc Networks," 2007 Mobile Networking for Vehicular Environments, 6 pgs. (May 2007).

"Car 2 Car Communication Consortium Manifesto—Overview of the C2C-CC System", retreived from the Internet at http://www.car-to-car.org, 94 pages (Aug. 2007).

Robinson, C., et al. "Efficient Message Composition and Coding for Cooperative Vehicular Safety Applications," IEEE Trans. on Vehicular Technology, vol. 56, No. 6, pp. 3244-3255 (Nov. 2007).

"IEEE Trial-Use Standard for Wireless Access in Vehicular Environments (WAVE)—Networking Services," IEEE Std 1609.3, 99 pgs. (2007).

Chen, Q, et al. "Overhaul of the IEEE 802.11 Modeling and Simulation in NS-2"; Proc. of the $10^{th}$ ACM Symp. on Modeling, Analysis, and Simulation of Wireless and Mobile Systems, pp. 159-168 (2007).

Ma, X., et al. "Delay and Broadcast Reception Rates of Highway Safety Applications in Vehicular Ad Hoc Networks," 2007 Mobile Networking for Vehicular Environments, pp. 85-90 (2007).

Bilstrup, K., et al. "Evaluation of the IEEE 802.11p MAC Method for Vehicle-to-Vehicle Communication," IEEE $68^{th}$ Vehicular Technology Conf., 5 pgs. (2008).

Yang, L., et al. "Channel Adaptive One Hop Broadcasting for VANETs", Proc. of the $11^{th}$ Int'l. IEEE Conf. on Intelligent Transportation Systems, pp. 369-374 (2008).

"Dedicated Short Range Communications (DSRC) Message Set Dictionary"; SAE Standard J2735 (2009) [Uploaded to Pair as Parts 1-4].

Kuge, T., et al. "An Analysis of Performance Degradation Caused by Hidden Terminal and its Improvement in Inter-Vehicle Communication", $9^{th}$ Int'l. Conf. on Intelligent Transport Systems Telecommunications, pp. 482-485 (2009).

Vinel, A., et al. "Study of Beaconing for Car-to-Car Communication in Vehicular Ad-Hoc Networks", Communications Workshops, 2009, ICC Workshops 2009, IEEE Intl. Conference on; 5 pgs. (2009).

IEEE Standard for Information Technology—Telecommunications and Information Exchange Between Systems—Local and Metropolitan Area Networks—Specific requirements—Part 11: Wireless LAN Medium Access Control (MAC) and Physical Layer (PHY) Specifications: Amendment 6: Wireless Access in Vehicular Environments, 51 pgs. (2010).

Mittag, J., et al. "MAC Layer and Scalability Aspects of Vehicular Communication Networks"; VANET: Vehicular Applications and Inter-Networking Technologies, pp. 219-269 (2010).

Torrent-Moreno, M. et al. "Vehicle-to-Vehicle Communication: Fair Transmit Power Control for Safety-Critical Information," IEEE Trans. on Vehicular Technology, vol. 58, No. 7, pp. 3684-3703 (Sep. 2009).

Batsuuri, Tseesuren et al; "Application level phase adjustment for maximizing the fairness in VANET"; IEEE Explore; $7^{th}$ Int'l Conference on Mobile Adhoc and Sensor Systems; 8 pages; Nov. 2010.

Extended European Search Report for application 12163303.6 (Mar. 6, 2013).

Campolo, Claudia et al; "Characterizing Broadcast Packet Losses in IEEE 802.11 p/Wave Vehicular Networks"; IEEE $22^{nd}$ International Symposium on Personal, Indoor and Mobile Radio Communications; 5 pages (Sep. 11, 2011).

Sjobert, Katrin et al; "How Severe is the Hidden Terminal Problem in VANETs when Using CSMA and STDMA?" IEEE Vehicular Technology Conference; 5 pages (Sep. 5, 2011).

\* cited by examiner $$a_i^{(k)} \stackrel{\text{def}}{=} \phi_i + kT_i$$

Figure 8a $$a_i^{(k)} \stackrel{\text{def}}{=} \begin{cases} \phi_i & \text{if } k = 0 \\ a_i^{(k-1)} + T_i & \text{if } k > 0 \land (k + \phi_e) \bmod er_i \neq 0 \\ a_i^{(k-1)} + r(2T_i) & \text{if } k > 0 \land k \bmod er_i = 0 \end{cases}$$

Figure 8b $$a_i^{(k)} = \phi_i + kT_i + AJ_i - r(2AJ_i)$$

Figure 8c $$a_i^{(k)} \stackrel{\text{def}}{=} \begin{cases} \phi_i & \text{if } k = 0 \\ a_i^{(k-1)} + T_i + AJ_i - r(2AJ_i) & \text{if } k > 0, (k + \phi_e) \bmod er_i \neq 0 \\ a_i^{(k-1)} + r(2T_i) + AJ_i - r(2AJ_i) & \text{if } k > 0, k \bmod er_i = 0 \end{cases}$$

ESTABLISHING FAIRNESS AND REDUCING DELAY IN BROADCAST BASED VEHICLE TO VEHICLE COMMUNICATION USING APPLICATION-LEVEL PHASE ADJUSTMENTS

CROSS-REFERENCE TO RELATED APPLICATIONS

This application claims the priority under 35 U.S.C. §119 of European patent application no. 12163303.6, filed on Apr. 5, 2012, and European patent application no. 11184905.5, filed on Oct. 12, 2011, the contents of each of which are incorporated by reference herein.

FIELD OF THE INVENTION

The invention relates to a method for a station to periodically broadcast messages over a wireless channel to communicate to multiple other stations who transmit on the same channel, the station becomes ready to broadcast at successive message activation times, at a message activation time the station performing a multiple access mechanism to resolve channel access competition and the station subsequently starting transmission of a message.

The invention further relates to the station.

BACKGROUND ART

Many future vehicle safety applications will rely on one-hop Periodic Broadcast Communication (oPBC). The key technology for supporting this communication system is the new standard IEEE 802.11p which employs the Carrier Sense Multiple Access/Collision Avoidance (CSMA/CA) mechanism to resolve channel access competition.

A rapid progress in mobile and wireless technologies in the last decade enables a wide spectrum of applications in the Intelligent Transportation System (ITS) domain targeting vehicle safety, transportation efficiency, and driver comfort. In recent years, many industry/government consortiums are formed around the world to carry out projects to investigate such applications: the Vehicle Safety Communications consortium in the US, the Car2Car Communication consortium in Europe, and the Internet ITS consortium in japan. As a result of these efforts, many interesting vehicle safety application scenarios are identified and their communication requirements are carefully examined. It is now becoming clear that most of these applications will rely on broadcast communication that cones in two flavors: event-driven and time-driven. In the event-driven (or emergency) case, a vehicle starts broadcasting a safety message for a certain duration periodically when a hazardous situation is detected and, hence, these messages are not sent in a normal situation. In the time-driven case, each vehicle continuously performs one-hop periodic broadcast communication (oPBC) to proactively deliver a beacon message with its status information (e.g., position, speed) to the neighboring vehicles. The key idea of such oPBC is to make each vehicle aware of its vicinity such that future vehicle safety applications running on the vehicle will leverage this information to detect any hazardous situation in a timely manner. Alone change advisor and a forward collision warning application are two typical examples that rely on this oPBC. These applications require a frequency of 10 messages per second with a maximum no message interval (or a tolerance time window) of [0.3 sec, 1.0 sec]. In addition, these applications pose a strict fairness requirement on oPBC, where each vehicle should have equal opportunity for using the shared channel. In this type of system, message loss is unavoidable (we explain the causes below), however, it must not be the case that one or a few vehicles take all the loss, because this would result in these vehicles becoming a danger to their surrounding vehicles.

We focus on this oPBC from the vehicle safety application perspective. Particularly, we are interested in oPBC which is addressed in the IEEE 802.11p. The 802.11p standard has been designed specifically for inter-vehicle communication. Besides the regular support for higher-layer protocols like IP, the 802.11p Medium Access Control (MAC) supports a short message protocol called WSMP (WAVE Short Messade Protocol, IEEE 1609, where WAVE stands for Wireless Access in Vehicular Environments). Among other uses, this WSMP protocol together with the SAE J2735 addresses the transmission of Basic Security Messages (BSM) also known as beacon messages that are used by a vehicle to inform other vehicles about its status and condition. The BSM (an example of a 'message') is sent periodically, in broadcast mode, with a typical frequency of 10 Hz.

In general, the members of the 802.11 family, where the 802.11p is one of the newest members, of wireless standards support two communication modes: a managed mode called Point Coordination Function (PCF) where a base station manages access to the channel and an ad-hoc mode called Distributed Coordination Function (DCF) where stations collaborate to manage channel access. In DCF, stations employ the Carrier Sense Multiple Access/Collision Avoidance (CSMA/CA) mechanism to resolve channel access competition. For point-to-point communication, stations repeatedly perform channel sensing followed by a random Back-off (Bf) period selected from an increasing Contention Window (CW). Bf is used to reduce the probability of a contention problem which occurs when two or more stations that exist in each other's Communication Range (CR) incidentally happen to start transmission at the same time causing collisions. In addition, Request To Send/Clear To Send (RTS/CTS) signaling is used to resolve the hidden terminal, or Hidden Node (HN), problem which occurs when two stations that are outside each other's CR have overlapping transmissions in time interfering with their common neighbors in the intersection of the CRs. On top of this, a MAC level acknowledgement can be used to resolve the remaining message losses. An initial channel access delay, namely Arbitration Inter Frame Space (AIFS), allows discriminating among several priority classes. When stations broadcast messages rather than sending them point-to-point the situation in DCF is quite different. First. CW from which a Bf period is drawn is fixed, and Bf is at most done once. Second. RTS/CTS signaling and MAC layer acknowledgement do not work since there is no particular destination for a message. As a result, when all stations use broadcast-based communication, the collision problems, i.e., the contention and the HN problems increase. FIG. 1a gives an overview of the 802.11p communication behavior in broadcast mode and illustrates the collision problems.

The article "Model, analysis, and improvements for inter-vehicle communication using one-hop periodic broadcasting based on the 802.11p protocol" by Tseesuren Batsuuri, Reinder J. Bill, and Johan Lukkien and the article "Model, analysis, and improvements for vehicle-to-vehicle communication using one-hop periodic broadcasting based on the 802.11p protocol" by the same authors and filed as the priority text of this application are both incorporated by reference.

SUMMARY OF THE INVENTION

It would be advantageous to have an improved method for a station to periodically broadcast messages over a wireless channel to communicate to multiple other stations that transmit on the same channel. A method is provided wherein the station becomes ready to broadcast at successive message activation times, at a message activation time the station performing a Multiple Access mechanism to resolve channel access competition and the station subsequently starting transmission of a message, wherein at least two successive message activation times differ a random time interval.

Periodic broadcasting by multiple, independent stations using a Multiple Access channel suffers from three closely related problems: a) message loss due to inadvertently synchronized broadcasting stations; b) an unfair distribution of such loss over the stations and c) long black-out periods. These problems become compelling when scaling to larger system sizes, or more precisely, when channel utilization increases, which happens upon increasing the number of stations. A method is provided to solve or mitigate both b) and c) using randomization at application level and without requiring any further synchronization among stations.

In period broadcasting it may happen that two stations inadvertently broadcast in sync. If those two stations are within each others broadcasting range the Multiple Access mechanism may be able to resolve the channel access competition partially (e.g, using Collision Avoidance). However, if those two synced stations are outside each other's range but within range of a third station, they cause the hidden node problem which, in case of broadcasting, cannot be alleviated using methods like RTS/CTS. By having two successive message activation times differ a random time interval, i.e. a random amount of time, this problem is alleviated. Preferably, the random time interval is chosen randomly each time the random time interval is inserted, possibly according to a random time interval selection scheme. As the synchronization which occurred before the random time interval is perturbed, the probability of a station being blind for long periods of time for another station is also reduced. This improves fairness: no longer are there 'unlucky' stations that experience more than an average number of collisions because of an unfortunate synchronization, while other stations have no problems. This also improves message delay.

Advantageously, this improvement only requires application level adaptations. The Multiple Access mechanism that is used need not be changed. Only the moment at which the Multiple Access mechanism is started is changed.

In a preferred embodiment, the stations are comprised in vehicles, in particular motorized vehicles, such as cars, trucks or motorcycles, and the like. Thus the method provides improvements for inter-vehicle (vehicle to vehicle) communication using one-hop periodic broadcasting, in particular, communication based on the IEEE 802.11p protocol. Also the multiple other stations may each be comprised in a corresponding different vehicle, e.g., cars. The station and multiple other stations together form a system for periodically broadcast messages among them.

For example, all stations share a single radio frequency communication channel. Transmissions on this channel are received by all stations within range. A carrier frequency is used to transmit the data in packets, for example, "Ethernet frames". Each station is constantly tuned in on the radio frequency communication channel to pick up available transmissions.

The wireless broadcast may use the 802.11p standard which has been designed specifically for inter-vehicle communication. Besides the regular support for higher-layer protocols like IP, the 802.11p Medium Access Control (MAC) supports a short message protocol called WSMP (WAVE Short Message Protocol, IEEE 1609, where WAVE stands for Wireless Access in Vehicular Environments). Among other uses, this WSMP protocol together with the SAE J2735 addresses the transmission of Basic Security Messages (BSM) also known as beacon messages. An embodiment of a system according to the invention uses WAVE.

The messages which are periodically broadcast to the multiple other stations may be one-hop periodic broadcast communication (oPBC) to pro-actively deliver a beacon message with the station's vehicle status information (e.g., position, speed). A message may also communicate course changes of the vehicle, e.g. taking a turn or changing lanes, to the neighboring vehicles so that each vehicle is aware of the state of vehicles in its vicinity.

In an embodiment, the station collaborates with the multiple other stations managing channel access by employing the Carrier Sense Multiple Access/Collision Avoidance (CSMA/CA) mechanism at a message activation time. IEEE 802.11p, including its Carrier Sense Multiple Access/Collision Avoidance (CSMA/CA) is described in "IEEE Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment: Wireless Access in Vehicular Environments," IEEE Unapproved Draft Std P802.11p/D11.0, March, 2010.

Note that that at a message activation time the station will typically not directly start with transmitting. Typically, a protocol is started instead which avoids channel collisions.

A multiple access mechanism to resolve channel access competition may comprise checking if the channel is busy or becomes busy for a duration of an Arbitration inter Frame Space (AIFS), and if the channel is busy or becomes busy the station waits for the channel to become idle. If the channel was busy or became busy, the Arbitration Inter Frame Space may be followed by waiting a random Back-of (Bf) period selected from an increasing Contention Window (CW). However, this mechanism separates at most as many stations as there are slots constructed in this way and fails thereafter. In addition, it does not address the hidden terminal problem.

Having a random time interval between at least two successive message activation times is advantageous. Periodically having a random time interval between multiple two successive message activation times is even more advantageous. It is preferred however, that two successive message activation times differ on average the broadcasting period. This will keep the frequency of the broadcasting about equal to a standard implementation in which all messages activation times differ strictly the broadcasting period.

One way to avoid remaining inadvertently synchronized is to periodically change the phase of the periodically broadcast messages. The phase defines where in the period the activation is taking place and may be defined with respect to an imaginary start of the system; The phase may be computed with respect to message activation times which are strictly periodic, i.e., each two successive messages of the strictly periodic messages differing exactly the broadcast period. In an embodiment, two successive message activation times differ the broadcasting period or they differ a random time interval, preferably selected in an interval of twice the period. This random change may be inserted at random, or periodically. The rate of change is called the elastic rate. For example, the station may be configured with an elastic rate. The elastic rate is preferably expressed as a number, of say 2 or 6. Periodically, after an elastic rate number of message activation times have passed, two successive message activation times differ a random time interval as indicate above. In this way the phase of the message activation times is changed. A random time interval is an interval having a random time duration. A method in which an elastic rate is used to periodically change the phase of the periodic broadcast is referred to as an 'elastic scheme'.

It has been found that the more often the phase is changed, the better the elastic scheme improves the fairness and the delay characteristics. The reason for this result is that frequent change of phasing in the elastic scheme which affects the channel condition of the vehicle. Under the frequent change of the channel condition, the lifetime of a synchronized period of the vehicles (also a period of favorable channel condition of the vehicle) becomes shorter, i.e., highly likely to be at most the elastic rate period. As a result, each vehicle experiences more or less the same fluctuating channel conditions in the long run.

The phase of broadcasting may be changed at a regular basis. The elastic rate defines how often the phase should be changed. How much the phase should be changed may be determined randomly within a given interval. To keep the expected number of generated messages the same as in the strict periodic scheme, 2 times the broadcast period may be selected as that given interval.

Particularly good results have been found with an elastic rate of 2. In that case, the station may use message activation times that alternately differ the broadcast period, and a random time interval; the random time interval being selected randomly, e.g. uniformly randomly, from 0 to twice the broadcast period. However, fairness is improved drastically already at a higher value of the elastic rate, say an elastic rate of 6 or higher. Higher values are preferred since they make the system more predictable.

One other way to avoid remaining inadvertently synchronization is to introduce jitter on the message activation times. For example, the station may be configured with an activation jitter. Successive message activation times differ the broadcasting period plus a random value. The random value is the activation jitter minus a random value between 0 and twice the activation jitter. The random value thus lies in the interval [−activation jitter, +activation jitter).

Using only activation jitter does not break the synchronization, since it does not change the phase. Messages are sometimes shifted up sometimes down in time. Thus it is avoided that the same vehicle will always win the multiple access mechanism, and, as a result, it breaks long black-out period between vehicles.

It is found that jitter works best when it is comparatively large with respect to the message transmission time, i.e., the time to transmit one message. For example, the activation jitter may be more than or equal to 2 times the transmission time of a message. More preferably the activation jitter is more than or equal to 20 times the message transmission time. An activation jitter is less than a broadcast period; most preferably the activation jitter should be less than 10% of a broadcast period.

Activation jitter and elastic rate (phase changing) may both be used. This solution outperforms both having only an elastic rate or, only activation jitter. It improves the fairness (i.e., distribution of successful message reception ratio over vehicles) and reduces message delay.

Note that successive message activation times should be increasing. If due to a large negative jitter, possibly in combination with a small random time interval, a next message activation time would be "earlier" or too close to the previous message simply a very short interval between messages activations is used.

For example, a station may be configured with an elastic rate and an activation jitter. Successive message activation times then differ the broadcasting period plus a random value or a random time interval. The random value and random time interval may be selected as above. In an embodiment, the random time interval may be introduced after an elastic rate of message activation times have passed. The jitter may either be used always or only when the elastic scheme is not used.

The invention establishes fairness and reduces blackout periods in broadcast based vehicle. To vechicle communication using application-level phase adjustments The invention further relates to a station that periodically broadcasts messages over a shared channel to communicate to multiple other stations who transmit on the same channel, the station is configured to become ready to broadcast at successive message activation times, the station is configured to performing a Multiple Access mechanism to resolve channel access competition at a message activation time and to subsequently start transmission of a message, wherein at least two successive message activation times differ a random time interval.

The invention further relates to a system comprising the station and the multiple other stations.

The invention further relates to a computer program comprising computer program code means adapted to perform all the steps of a method for a station to periodically broadcast messages over a wireless channel. The invention further relates to a computer readable medium comprising such a computer program.

The station is an electronic device, and may be comprised in, e.g., a mobile electronic device, mobile phone, a computer, a router, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1a gives an overview of the 802.11p communication behavior in broadcast mode, FIGS. 8a, 8b, 8c, 8d show message activation times.

Figure 1A:
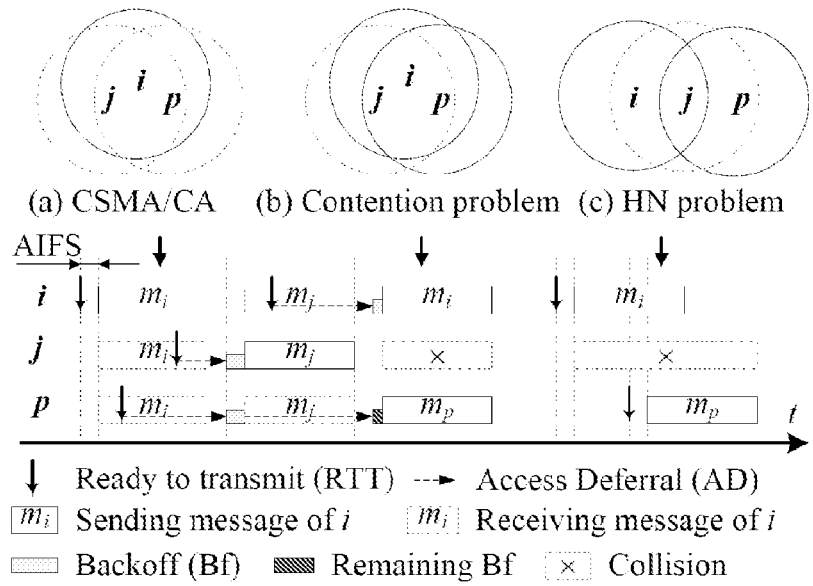
FIG. 1b illustrates schematic channel contention and message collision.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

We first aim at understanding the behavior of such oPBC under varying load conditions by considering three important quality aspects of vehicle safety applications: reliability, fairness, and delay. Second, we investigate possible improvements of these quality aspects. We start with a clear mathematical model which gives the foundation for making an accurate simulation model as well as for defining new appropriate metrics to judge the aforementioned quality aspects. We evaluate oPBC with a strictly periodic broadcasting scheme, i.e., each vehicle broadcasts messages in a strictly periodic manner. The evaluation reveals that the hidden terminal, or Hidden Node (HN), problem is the main cause of various quality degradations especially when the network is unsaturated. To be more specific, the HN problem reduces the message reception ratio (i.e., reliability degradation) and causes unfair message reception ratios for vehicles (i.e., fairness degradation). Moreover, it causes long lasting consecutive message losses (i.e., delay deoradation) between vehicles while they are encountering each other, i.e., entering their Communication Ranges (CRs). In some serious cases, a certain vehicle could not successfully deliver any of its messages to a particularly destination vehicle throughout an entire encounter interval of these two vehicles. We propose three simple but effective broadcasting schemes to alleviate the impact of the HN problem. Though these solutions do not affect the message reception ratio (i.e., reliability) of the entire network, they do improve the fairness and delay aspects. These solutions are fully compatible with the IEEE 802.11p standard, i.e., they are application-level solutions and can be easily introduced in practice.

FIG. 1a: the 802.11p MAC CSMAICA in broadcast mode. (a) shows the contention protocol that serializes three stations. A station, which wants to transmit, first must check if the channel is free for a duration of Arbitration inter Frame Space (AIFS). In case the channel is found active during this duration, the intended transmission is deferred and a Bf is performed. (b) shows a message collision due to a contention problem which happens if incidentally, two stations start transmission at the same time (mainly because their Bf periods expire at the same time), i.e., a Neighboring Node (NN) collision. (c) shows a message collision due to the Hidden Node (HN) problem, i.e., a HN collision: two stations that cannot sense each other's transmission may cause message collisions in the intersection of their Communication Ranges (CRs).

The purpose of our research is to understand the behavior of this oPBC based on the 802.11p DCF. We want to understand message losses due to the contention and HN problems under varying load conditions. In particular we want to understand oPBC by considering three quality aspects which are important for vehicle safety applications: reliability (i.e., successful message reception ratio), fairness (i.e., distribution of successful message reception ratio over vehicles) and delay (i.e., no message interval that is the longest interval in which a vehicle that is in the CR of another vehicle doesn't receive a message from that latter vehicle.). In addition, we want to investigate possible improvements.

Our first step is to develop a mathematical model of the 802.11p behavior under oPBC. This serves three purposes. First, it makes the discussion unambiguous. Second, it gives the foundation for a simulation model and third, it allows us to develop new relevant metrics (criteria) to judge communication quality for the above aspects. Standard performance metrics like a successful message reception ratio of the entire network or an average end-to-end delay fall short in this environment. Our second step is to simulate according to this model and to determine the values of the given metrics. This gives us insight in shortcomings of this oPBC and gives directions for improvements.

We simulated oPBC under several different circumstances showing problems and shortcomings. Namely, the simulation reveals that the HN problem is the main cause of various quality degradations when the network is unsaturated. It reduces the message reception ratio of the entire network (i.e., reliability dedradation) and causes unfair message reception ratios for vehicles (i.e., fairness degradation). Moreover, it causes long lasting consecutive message losses (i.e., delay degradation) between vehicles while they are encountering each other, i.e., entering their CRs. In some serious cases, a certain vehicle could not successfully deliver any of its messages to a particularly destination vehicle throughout an entire encounter interval of these two vehicles. We identified application-level improvements. We propose three simple but effective broadcasting schemes to alleviate the impact of the HN problem. These solutions are fully compatible with the IEEE 802.11p standard, i.e., they are application-level solutions and can be easily introduced in practice.

Three quality aspects of oPBC, i.e., reliability, fairness, and delay are considered.

Two models: in our analysis of communicating vehicles we encounter two aspects: a simulation of the movement of the vehicles and a simulation of the behavior of the wireless communication as a function of the position of the vehicles. Thus we have the traffic model which yields the position of vehicles as a function of time and the communication model that describes the communication events between vehicles as a function of time and vehicle location. Hence, the communication model depends on the traffic model (but not the other way around).

The interface between the two models is formed by the location of the vehicles. Together with the radio channel model this yields the neighborhood structure viz., a set of vehicles that each vehicle can transmit to or receive from at any point in time. The traffic model can be very advanced, even to the extent that life traces are simulated. We are not concerned, however, with the traffic model. For our simulations we stick to a simple highway model, represented as a stretch of several kilometers with three lanes per direction and periodic boundary conditions (which makes it, in fact, a loop). Speeds per lane are assumed to be fixed. In simulations the main concern of the traffic model is to simulate with a small enough time step to have a realistic and sufficiently accurate description for the communication model. The motivation for this restriction is that we want to study just the communication model under varying load conditions.

The communication model: The communication model consists of two parts: First, we describe the communication of the 80211p standard and the radio channel model that generates the events. Second we model timing and events in the system consisting of communicating vehicles to define the concepts of interest.

Figure 2:
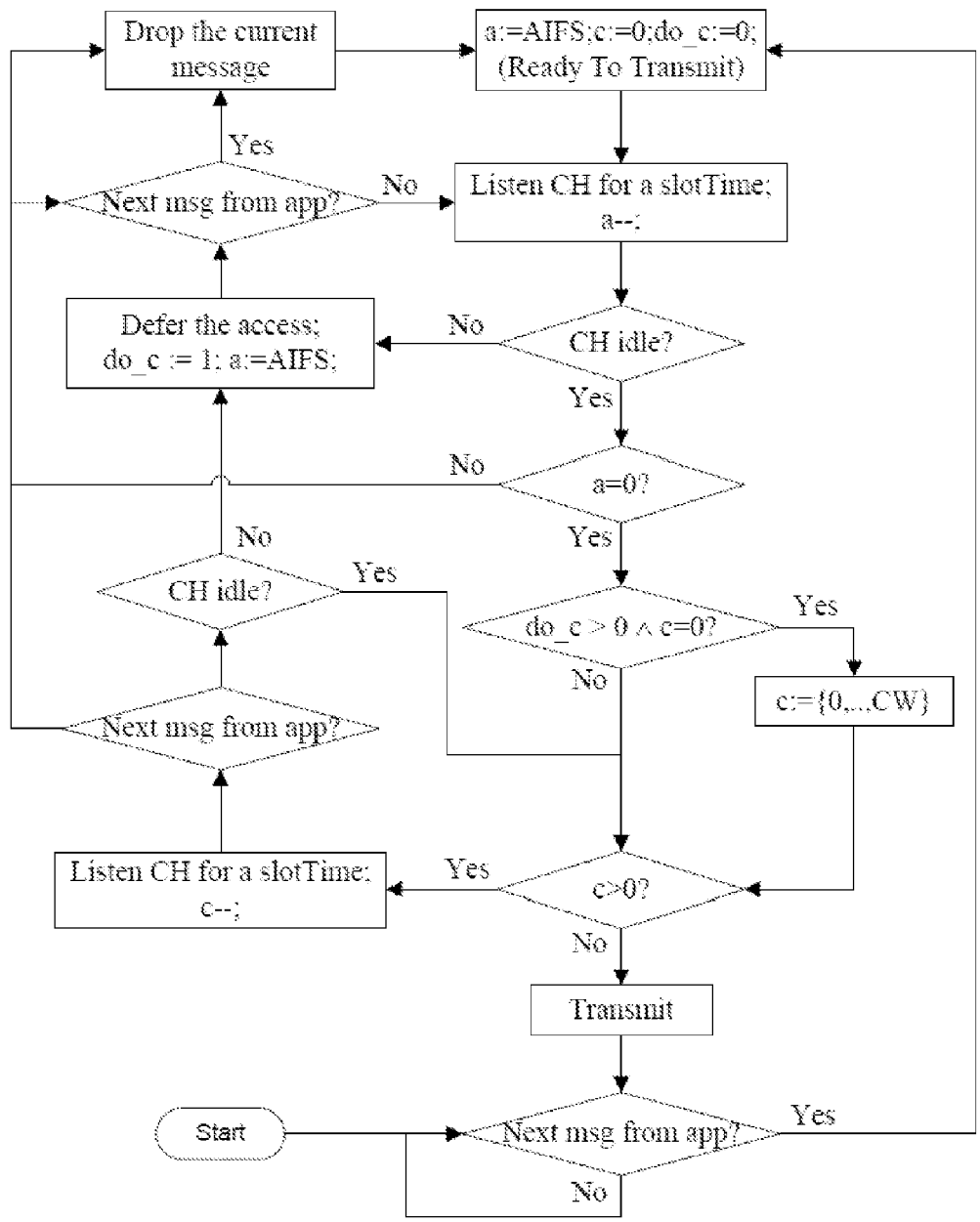
FIG. 2 shows in a flowchart how CSMA/CA operates in periodic broadcast mode and FIG. 3 gives a corresponding state machine diagram, FIG. 4 show results of the elastic scheme, FIG. 5 show results of the jitter scheme, FIG. 6 show results of the elastic+jitter scheme.

The 802.11p communication and the radio channel model: We restrict ourselves to describing the broadcast mode of the 802.11p MAC. In FIG. 2 gives an extended flowchart of the broadcast procedure taken from and FIG. 3 describes the corresponding state machine diagram. In our simulation model, every vehicle is implemented according to this state machine. Besides, we take a Signal to Interference plus Noise Ratio (SINR) based signal reception model of the updated NS-2 implementation of the 802.11p. In addition, we choose the Two-Ray Ground (TRG) signal propagation model in order to study solely the effect of message collisions. The main configuration parameters of the 802.11p and the TRG model are chosen as in Table 1.

TABLE 1

The 802.11 p parameter settings

| Parameters | Values |
| --- | --- |
| Date rate | 6 Mbps |
| A slot duration | 13 μs |
| AIFS | 6 slots |
| CW size | 7 slots |
| Th (Preamble length) | 40 μs |
| Antenna gain | 0 dB |
| Antenna height | 1.5 m |
| Noise floor (nF) | −99 dBm |
| Power Sense threshold (PsTh) | −92 dBm |
| Carrier sense threshold (CsTh) | −85 dBm |
| SINR threshold (SrTh) | 8 dB |

Figure 1B:
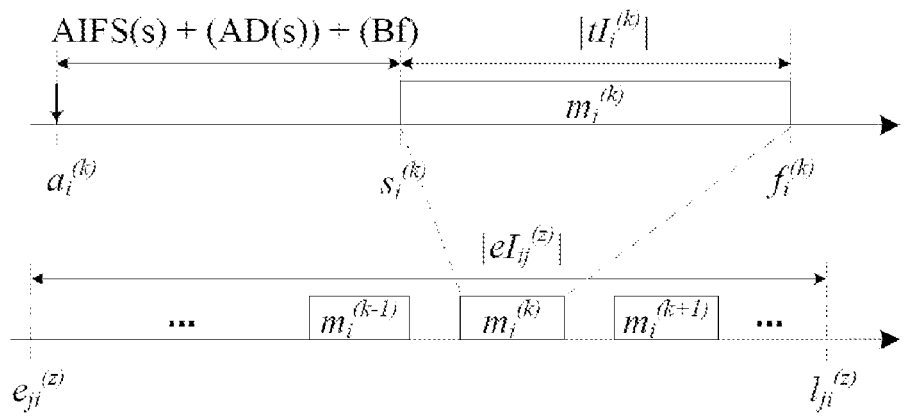

FIG. 1b illustrates schematically channel contention and message collision. Vehicle $v_j$ enters the Communication Range (CR) of vehicle $v_i$ at $e(z)_{ji}$ and leaves it at $l(z)_{ji}$. During this encounter interval, $v_j$ receives a sequence of messages from $v_i$. A vehicle $v_i$ becomes ready to broadcast its kth message at $a(k)_i$ (i.e., a message activation time) i but it actually starts the transmission at $s(k)_i$ and finishes at $f(k)_i$. The distance between $a(k)_i$ and $s(k)_i$ depends on the channel condition. In the best case, it can be only an AIFS. In the worst case, it can be multiple AIFSs+multiple ADs (Access Deferrals)+Bf.

Message loss: The most important concern is whether messages are actually received by vehicles that could receive them. Considering message $m(k)_i$ there are three reasons why another vehicle A might not receive it.

(OOR) Out Of Range. In order for a vehicle $v_j$ to receive $m(k)_i$ it must be in the neighborhood of $v_i$ for the duration of the transmission.

(MD) Message Dropping. This happens, as described above, if the back-off interval becomes so long that the message transfer time does not fit in the remaining part of the period. No vehicle will receive message $m(k)_i$.

(MC) Message Collision: The message is transmitted but not received by $v_j$ since other vehicles may transmit at the same time to $v_j$ and their interferences are strong enough to corrupt the receiving message of $v_i$.

We implemented a simulator for oPBC according to the model and verified its correctness against the updated NS-2 implementation of 802.11p. The following subsections describe the simulation setup Simulation Set Up: For the purpose of this evaluation, two different scenarios are simulated. In the first scenario (single domain (SD)), vehicles are deployed at fixed locations within a single CR viz., all vehicles can receive each other's messages. This scenario allows us to study the collisions caused only by the contention problem, i.e., NN collisions since there are no HNs. In the second scenario (multi domain (MD)), vehicles are deployed on a 3 km long highway with three lanes per direction. This scenario allows us to study both HN and NN collisions. By having these two scenarios, we can compare the impact of these two types of collisions. The vehicles at the three lanes have fixed velocities of 20, 30, and 40 m/s respectively. In both scenarios, different inter-vehicle spacings are used in order to create different Vehicle Densities (VD). We assume a sindle channel, a fixed broadcasting period and initially, a random phasing within this period. Two message activation times differ exactly the broadcast period.

Thus, each vehicle $v_i$ has a broadcasting period $T_i$ (a real positive number) and an initial broadcasting phase (a real positive number, indicated with the letter phi) uniformly selected from an interval of Rii). Moreover, we assume the same signal strength, the same broadcasting period, the same message size fixed over time for all vehicles. Table 2 presents the values of the simulation parameters.

TABLE 2

Simulation settings

| Parameters | Values |
| --- | --- |
| Message size | 555 bytes |
| CR | 300 m |
| Broadcasting Period (T) | 0.1 seconds |
| Simulation length | 60 seconds |

Figure 7:
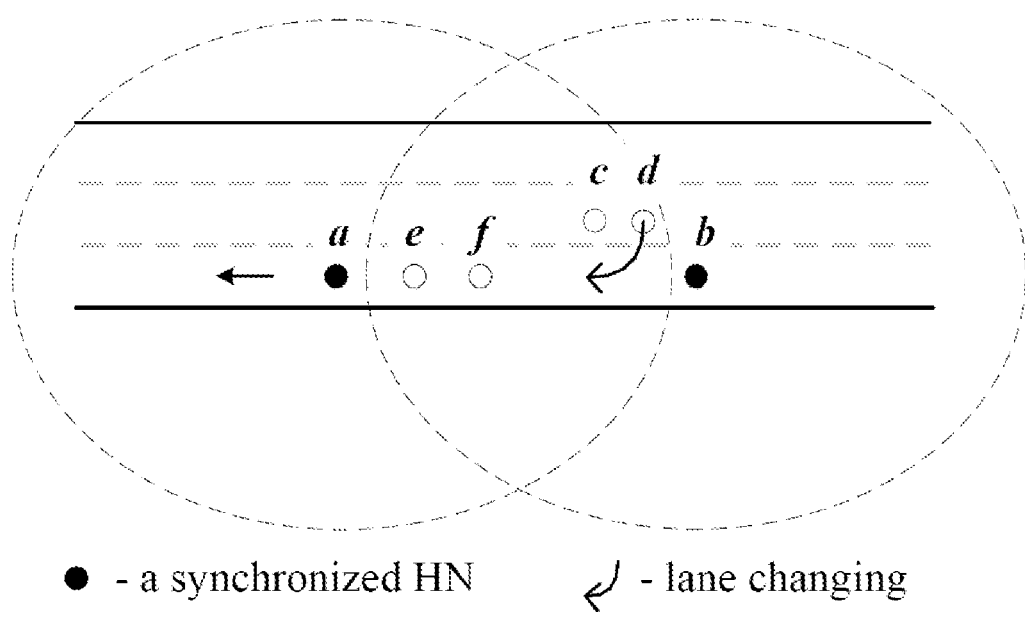
FIG. 7 illustrates two examples of dangerous situations caused by synchronized HNs.

We are interested in the collision problems in oPBC, particularly the HN problem, when the traffic density is moderate or sparse, i.e., when the network is unsaturated. We assume that in that situation message loss is even more serious in terms of vehicle safety since the vehicles can have relatively high speeds. Therefore, such traffic conditions should have even stricter requirements on the communication. In the following sections, we look into three broadcasting schemes that can alleviate the impact of the collision problems. The key idea of these schemes is to break the synchronization between vehicles as much as possible to prevent the systematic message loss. FIG. 7 illustrates two examples of dangerous situations caused by synchronized HNs. Vehicles "a" and "b" are synchronized HNs. In the picture, vehicle "d" is changing lanes assuming it is safe to do so. Because "b is synchronized with "a", the driver of "d" is not informed about "b". Another case is a forward collision situation, where vehicle "a" is slowing down but "e" and "f" are not aware of this.

For comparison FIG. 8a shows message activation times which are strictly periodic. Vehicle i (vi) has an initial phase phi_i. Each new message activation time $a(k)_i$ is one broadcast period more than the previous one.

A first approach is what we call the elastic scheme in which the initial phase of broadcasting is changed at a regular basis. In this scheme, the message activation time is defined as in FIG. 8b. The end is the elastic rate that defines how often the phase should be changed for vehicle i and r( ) is a function that returns a random value within the given interval. This value defines how much the phase should be changed. phi_e is a phase for starting elasticity and it is given as the floor of r(eri). To keep the expected number of generated messages the same as the strict periodic scheme, 2Ti is selected as the interval. The worst case delay between two messages is 2Ti.

Figure 4:
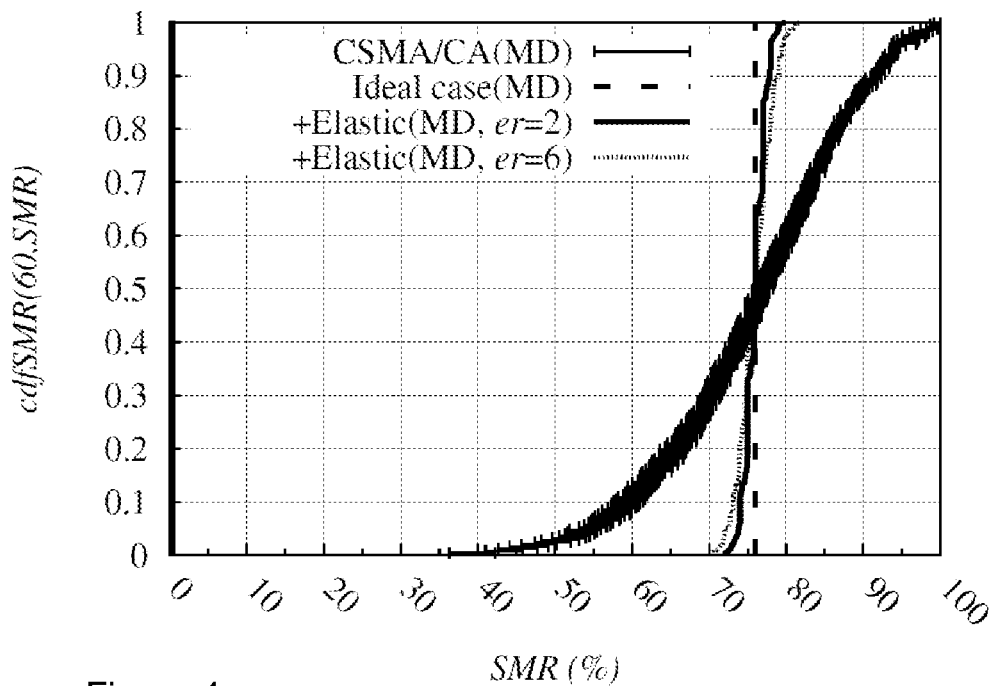

FIG. 4 show the results of this scheme in which we use the same er (elastic rate) for all vehicles. The more often the phase is changed, the better the elastic scheme improves the fairness and the delay characteristics. Particularly, the fairness is improved drastically even at the higher value of er. The reason for this result is the frequent change of phasing in the elastic scheme which affects the channel condition of the vehicle, tinder the frequent change of the channel condition, the lifetime of a synchronized period of the vehicles (also a period of favorable channel condition of the vehicle) becomes shorter, i.e., highly likely to be at most the er period. Each vehicle experiences more or less the same fluctuating channel conditions in the long run. The elastic scheme improves the fairness drastically, when VD is approximately 50.

From the fairness perspective, the behavior of individual vehicles is more important than the average. This is why we also analyze SMRi (successful message reception) to see whether losses are distributed evenly (or fairly) over the vehicles. The cumulative distribution function (cdfSMR) shows this; a fair distribution would give a transition from 0 to 1 within a short interval.

The second approach is what we call the jitter scheme in which the activation time is defined as in FIG. 8c. Herein AJi is an activation jitter that has a granularity of one message transmission time (i.e., AJ=N implies the actual jitter is AJ=NTd, N times the message transmission time). The worst delays between messages of this scheme, therefore, is equal to Ti+2AJi.

Figure 5:
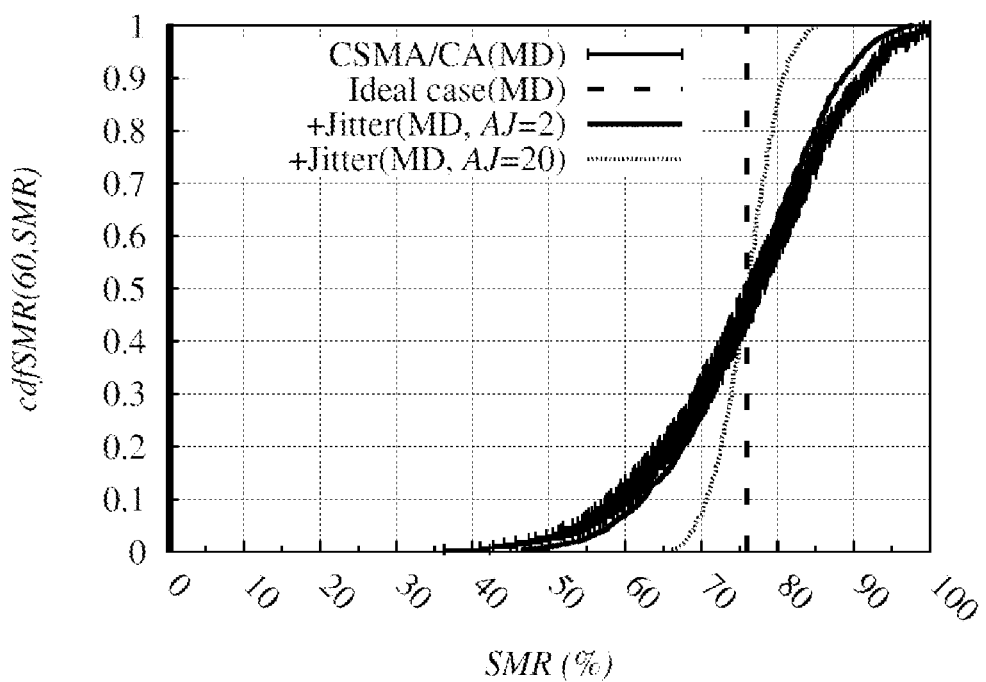

Again, we can make a number of observations. First, similar as the elastic scheme, the jitter scheme improves the fairness and the delay characteristics as shown in FIG. 5. We chose the same AJ for all vehicles. The bigger AJ is chosen, the better the jitter scheme works. Note that a small jitter size does not show much improvement. Compared to the elastic scheme, the jitter scheme needs a bioger jitter size to improve the fairness though a small jitter size already works pretty well on the delay characteristics. This indeed makes sense, because, in the jitter scheme, the channel condition of a vehicle does not change completely compared to the elastic scheme. Let's say there are two vehicles synchronized with each other causing message collisions on their receivers. For the elastic scheme, we showed that the lifetime of such synchronization becomes relatively short. But, in the jitter scheme, the two vehicles would remain synchronized during their entire encounter interval. The jitter only sometimes helps to prevent the message collisions happening. In addition, we can say that the jitter scheme works better than the elastic scheme on the delay characteristics. Particularly, we learn that the number of links on a 0.2-1 s interval is much lower than the elastic scheme result.

The jitter scheme improves the fairness, when VD is approximately 50. However, it shows that a small jitter does not help much for improving the fairness.

In addition to the previous two schemes, we also look into a third approach which is a combination of the elastic and the jitter schemes. We call this scheme as the Elastic+Jitter (EJ) scheme and it is defined as in FIG. 8d.

Figure 6:
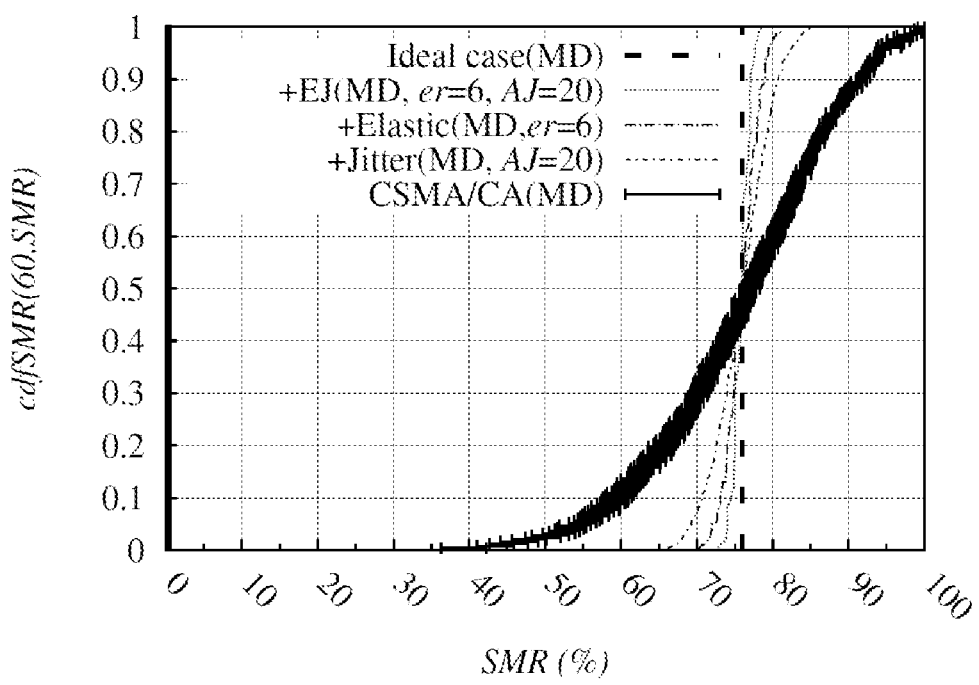

As hoped, this solution outperforms both previous schemes as shown in FIG. 6. This third solution features the advantages of both schemes. Similar as the elastic scheme, it does improve the fairness drastically. Similar as the jitter scheme, it improves the delay characteristics to a greater extent.

The jitter scheme improves the FD (First delay) significantly, when VD is approximately 50. In case of AJ=2, i.e., two times the transmission time, the number of cases for "5<" and "Never" are 31±6 and 29±9, respectively. In case of AJ=20, the number of cases for "5<" and "Never" are both 0. It shows that the jitter scheme performs better than the elastic scheme. In case of AJ=20, the number of the links in an interval of (0.2:1] is much lower. The result shown is an average often simulations with a confidence interval of 99%. The 'First Delay' is the length of the longest initial subinterval and represents a delay in discovery in case we apply it to an encounter interval.

Note that the final line of FIGS. 8b and 8d should read '(k+phi_e) mod er_i' instead of 'k mod er_i'.

Figure 9A:
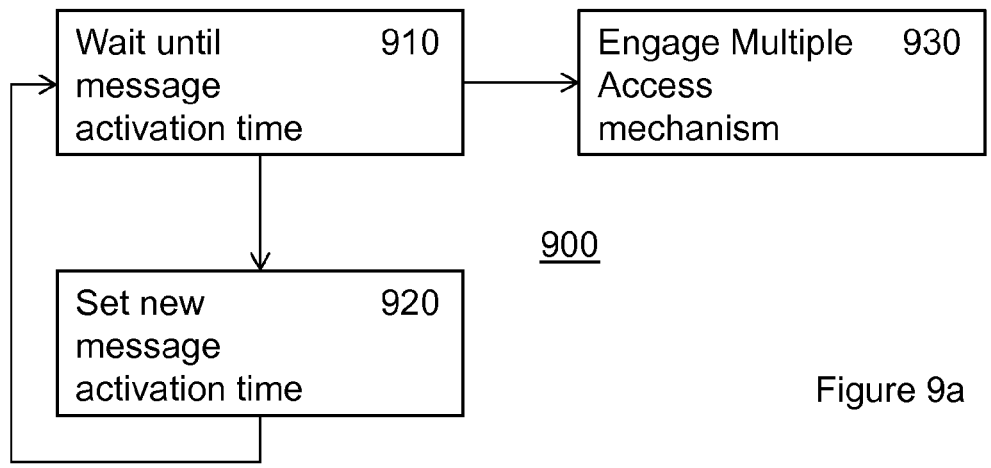
FIGS. 9a and 9b illustrate an embodiment of a method according to the invention.
Figure 9B:
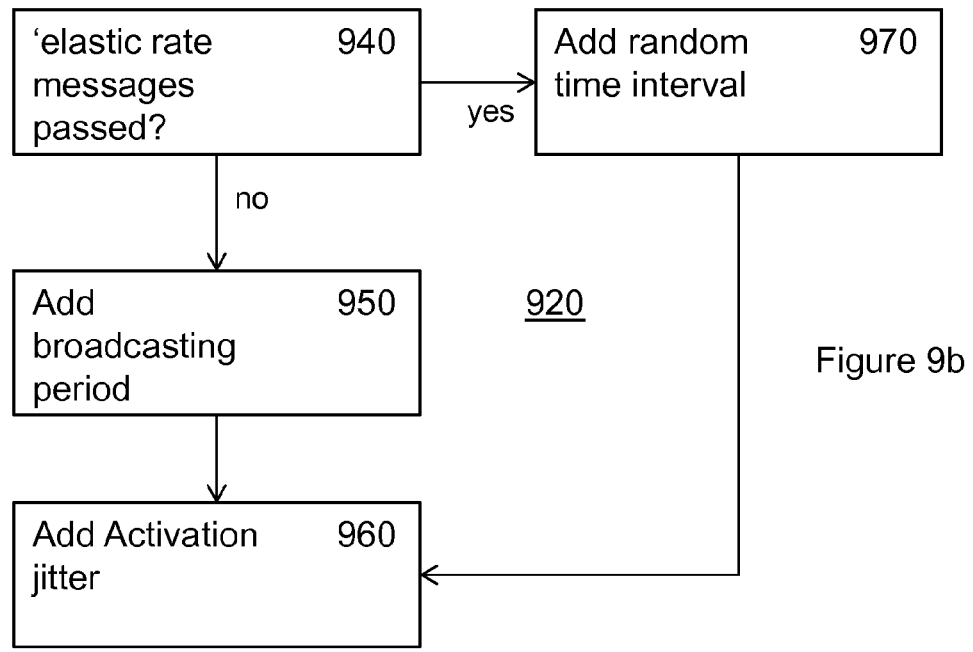
Figure 10:
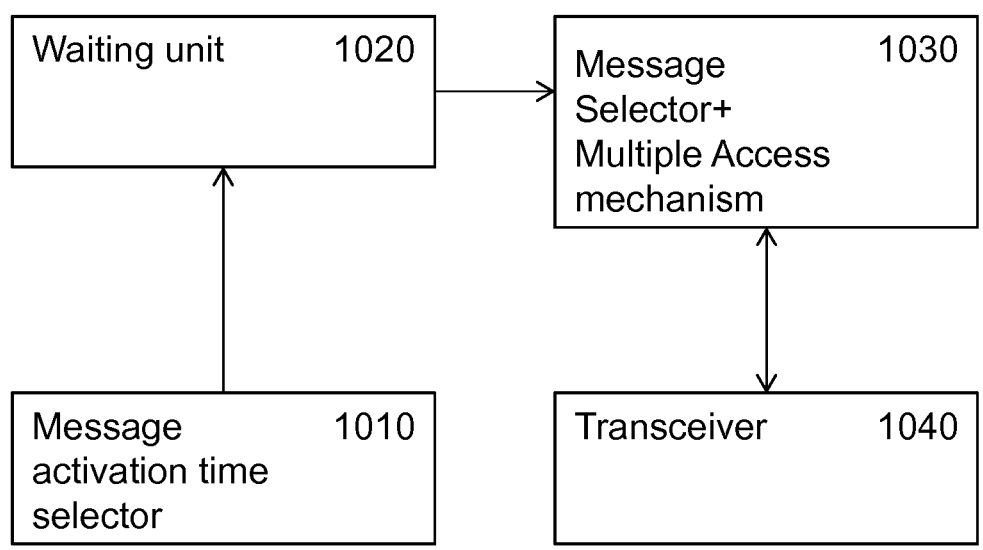
FIG. 10 shows a station 1000.

FIG. 10 shows a station 1000. FIGS. 9a and 9b illustrate possible ways to implement a method according to the invention, possibly using station 1000.

FIG. 9a shows the main loop of station 1000. A message activation time is selected 920. A waiting unit waits until the selected message activation time is reached 910. Then a multiple access mechanism 930 is engaged and a new message activation time is selected 920.

Station 1000 comprises a message activation time selector 1010. The Message activation time selector determines when the next message of a period broadcast is to be transmitted. Message activation time selector 1010 may use the method of FIG. 9b for that purpose. For example, first selector 1010 determines if elastic rate messages have passed 940, i.e., if that number of message activation times have passed before. This may be implemented by keeping a counter which is incremented each time a message activation time is reached. It may happen that even if a message activation time is reached no message is transmitted because the multiple access mechanism did not find a free slot on the channel. It is preferred to increment the counter regardless of whether a message is actually sent or not. Not sending a message may be the result of inadvertent synching. Once the counter is equal to the elastic rate the counter is reset to 0. If elastic rate messages have passed a random time interval is selected 970. The random time interval may be uniformly random between 0 and twice the broadcast period. The broadcast period may be configurable, it may also be fixed. For example, 0.1 second for the broadcast period is a possible choice. The random time interval may be added to the previous message activation time. After adding the random time interval 970 the station 1000 may continue with adding activation jitter 960.

If elastic rate messages have not passed, the broadcast period 950 is added. After the broadcast period is added 950, an activation jitter is added 960. The broadcast period may be added to the previous message activation time with or without the previous activation jitter. In the first case drift may arise, in the second case the message remain centered around certain predictable message activation times.

In an embodiment, the station selects the next message activation time by adding time intervals to the previous message activation time. Alternatively, the station may determine a 'wait time', i.e., an interval which is to be waited before becoming ready to broadcast. For example, step 920, may start with setting the initial wait time 0. Steps 950, 970 and 960 may add to the wait time instead of to the previous message activation time. Also when using the wait time, it is possible to correct for jitter in the previous message activation time; e.g. by deducting from the current wait time the jitter added to the previous message activation time or previous wait time. In a variation of FIG. 9b, not described in FIGS. 8a-8d, the activation jitter is not added in case the random time interval is added 970; in that case step 970 ends step 920.

Once selector 1010 has set the next message activation time, awaiting unit 1020 waits the set waiting time, or waits until the next message activation time. Once the waiting is done, the waiting unit 1020 activates the multiple access mechanism 930, i.e., the station enters ready to broadcast mode. It is stressed that once the message activation time is reached the message is not immediately transmitted. Instead a channel arbitration method is used to avoid local collision. For example, the method of FIGS. 2 and 3 may be used. In this embodiment the mechanism 1030 also selects the message, e.g., a status message for a vehicle collision avoidance system, etc. Once mechanism 1030 determines that the message may be sent, the message is passed to a transceiver 1040 for transmitting on the channel. Transceiver 1040 may also be used for receiving message and for sensing the channel to determine if the channel is free. After waiting 910 also a new message activation time is selected 920. This may use method 920 of FIG. 9*b*.

If no elastic rate is used, 940 and 970 may be omitted. If no jitter is used 960 may be omitted. Adding may be to the previous message activation time with or without the previous jitter. In an embodiment the multiple access mechanism 930 waits for the channel to be free for a certain period of time before transmitting the message. In more refined embodiment of multiple access mechanism 930 a back off period etc may be introduced, including e.g. full CSMA/CA.

Typically, the station 1000 comprise a microprocessor (not shown) which executes appropriate software stored at the device 1000, e.g., the software may have been downloaded and stored in a corresponding memory, e.g. RAM (not shown).

Figure 3:
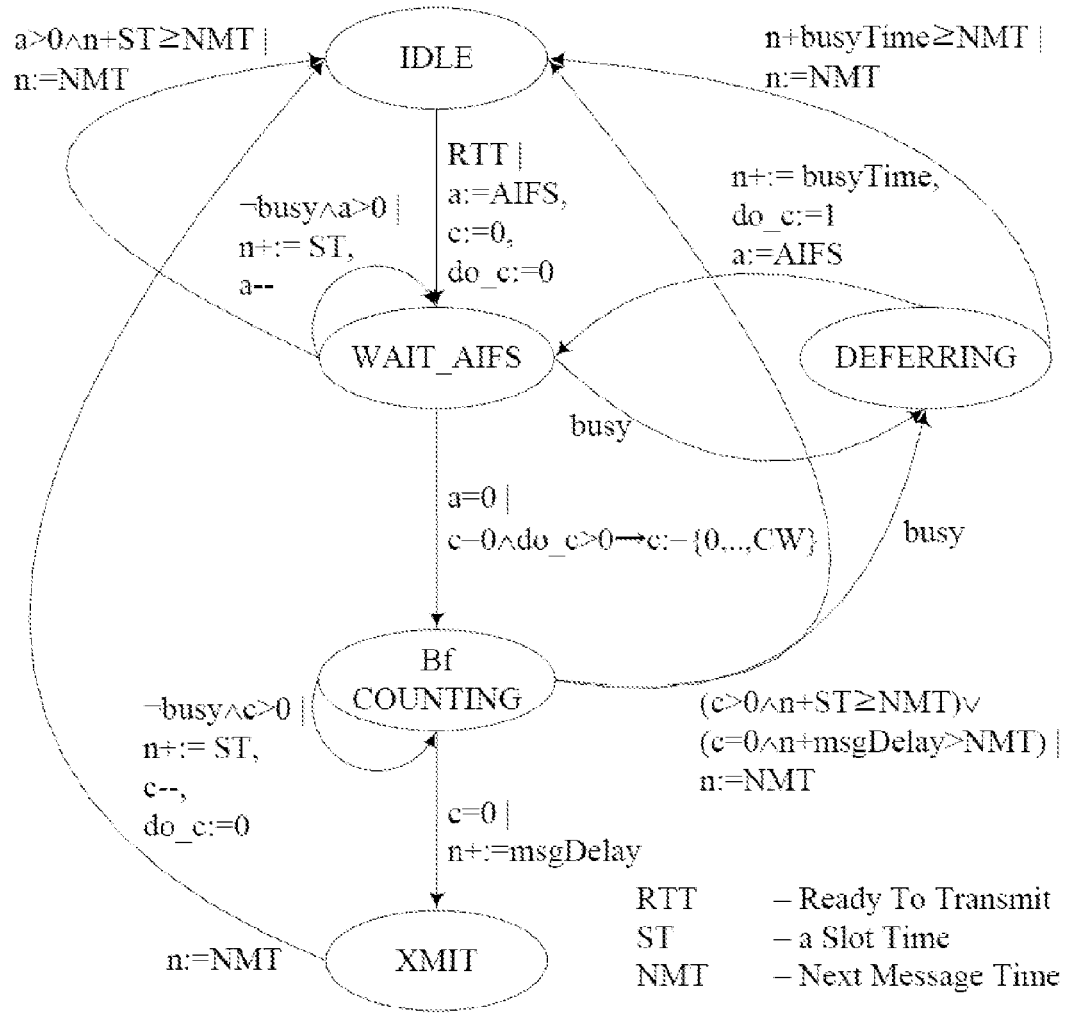

FIG. 2 shows in a flowchart how CSMAICA operates in periodic broadcast mode and FIG. 3 gives a corresponding state machine diagram. This section explains how CSMA/CA operates in periodic broadcast mode. According to CSMA/CA, when a station becomes ready to broadcast (Ready To Transmit (RTT), the station must first check the channel for a duration of AIFS. If the channel has been idle for longer than AIFS, the station starts its transmission immediately. If the channel is busy or becomes busy during AIFS, the station must wait for the channel to become idle. 802.11 refers to this wait as Access Deferral. If access is deferred, the station first waits for the channel to become idle for AlFS again. If the channel is idle, the station must perform Bf procedure by starting a Bf timer which is set to a random number drawn from an interval of {0,1, . . . , CW}. The timer has the granularity of a slot time and is decremented even/time when the channel is sensed to be idle for a slot time. The tinier is stopped in case the channel becomes busy and the decrementing process is resumed when the channel becomes idle again (i.e., idle for a duration of AIFS). The station is allowed to transmit its message when the Bf timer reaches zero. Depending on the channel condition, a station may experience multiple AIFS plus access deferrals. Note that the Bf counting is at most done once. If a new message arrives from the upper layer, then the current message must be dropped and the new message transmission will start.

As shown in the state machine diagram in FIG. 3, each station is in one of the five states: IDLE, WAITAIFS, DEFERRING, BfCOUNTING, and XMIT. The station is in the IDLE state when it is neither in transmission nor RTT. In this diagram, we use several variables and constants to show the state transition conditions and timing chances.

The "n" holds the current time.
The "a" holds the current value of the AIFS counting.
The "c" holds the current value of the Bf counting.
The "do_c" is a boolean variable to indicate whether the station should perform the Bf counting.
The "busyTime" is the duration of the channel being busy.

The "msgDelay" is the duration of one message transmission.
The "Next Message Time (NMT)" is the time at which the station becomes ready to transmit its next message.
The
The "busy" to indicate the busy channel.
The "AIFS" is the number of slots for the AIFS waiting and it is given by the standard.
The "CW" is the number of slots for the Bf and it is given by the standard.
The "a Slot Time (ST)" is the duration of one slot time and it is given by the standard.

The method described in FIG. 2 may be implemented using the state machine of FIG. 3; they may be used as a Multiple Access mechanism to resolve channel access competition. At a message activation time the station becomes 'ready to transmit', and start the flowchart of FIG. 2 at the top right corner.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 930 and 920 may be executed, at least partially, in parallel. Moreover, a given step may not have finished completely before a next step is started.

A method according to the invention may be executed using software, which comprises instructions for causing a processor system to perform e.g. method 900 and/or 920. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for a station to periodically broadcast messages over a wireless channel to communicate to multiple other stations who transmit on an identical wireless channel, the method comprising:
    selecting a message activation time;
    performing, with the station, a Multiple Access mechanism to resolve channel access competition with the multiple other stations; and
    transmitting, with the station, at least a first message and a second message, wherein successive message activation times between the first message and the second message differ by a random time interval.

2. The method as in claim 1, further comprising:
    employing a Carrier Sense Multiple Access/Collision Avoidance (CSMA/CA) mechanism at each message activation time.

3. The method as in claim 1, further comprising:
    checking, at each message activation time, whether the wireless channel is busy during an Arbitration Inter Frame Space (AIFS); and
    when the wireless channel is busy, waiting for the wireless channel to become idle.

4. The method as in claim 3, further comprising:
    selecting an increasing Contention Window (CW); and
    waiting for a random Back-off (Bf) period based on the selected Contention Window (CW).

5. The method as in claim 1, wherein successive message activation times differ, on average, by a broadcast period.

6. The method as in claim 1, further comprising:
    changing a phase of the periodically broadcast messages.

7. The method as in claim 6, wherein the random time interval is between zero and twice a broadcast period.

8. The method as in claim 1, wherein successive message activation times differ by a random time interval.

9. The method as in claim 1, further comprising:
    configuring the station with an elastic rate, wherein two successive message activation times differ by a random time interval.

10. The method as in claim 1, wherein the station is configured with an activation jitter, successive message activation times differ by a broadcast period plus a random value, and the random value is the activation jitter minus a random number between zero and twice the activation jitter.

11. The method as in claim 10, wherein each message has a message transmission time, and the activation jitter is at least twice the message transmission time.

12. The method of claim 11, wherein the activation jitter is at least twenty times the message transmission time.

13. The method of claim 11, wherein the activation jitter is less than the broadcast period.

14. The method of claim 13, wherein the activation jitter is less than 10% of the broadcast period.

15. The method as in claim 1, wherein the station is configured with an elastic rate and an activation jitter, successive message activation times differ by a broadcast period plus a random value.

16. The method of claim 15, wherein two successive message activation times differ by a random time interval after a number of message activation times have passed.

17. The method as in claim 1, wherein the station and the multiple other stations are each disposed in different vehicles.

18. A non-transitory computer-readable storage medium comprising a computer program which causes a computer to perform the method of claim 1 when the computer program is run on the computer.

19. A station configured to periodically broadcast messages over a wireless channel and communicate to multiple other stations which transmit on the same channel, the station comprising:
    a message activation time selector that is configured to select a message activation time, wherein the station is further configured to perform a Multiple Access mechanism to resolve channel access competition with the multiple other stations and transmit at least a first message and a second message wherein successive message activation times between the first message and the second message differ by a random time interval.

20. The station of claim 19, further comprising:
    a counter, wherein the counter is incremented each time each message activation time is reached.

* * * * *